United States Patent [19]

Strauss

[11] 4,162,062
[45] Jul. 24, 1979

[54] HYDRAULIC RAILWAY CAR SWAY DAMPER

[75] Inventor: Paul Strauss, Chicago, Ill.
[73] Assignee: Miner Enterprises, Inc., Geneva, Ill.
[21] Appl. No.: 802,799
[22] Filed: Jun. 2, 1977
[51] Int. Cl.² .............. B61F 5/12; B61F 5/24; F16F 9/24; F16F 9/36
[52] U.S. Cl. .............. 267/8 R; 105/197 DH; 188/315; 267/3; 267/8 A
[58] Field of Search .............. 105/197 DH; 188/313, 188/315, 318, 322; 267/3, 4, 34, 35, 8 R, 8 A, 8 D, 9 R, 9 C

[56] References Cited
U.S. PATENT DOCUMENTS

| | | | |
|---|---|---|---|
| 1,690,546 | 11/1928 | Mock | 267/8 A X |
| 2,099,240 | 11/1937 | Sproul | 267/4 |
| 2,206,110 | 7/1940 | Myers | 267/8 R X |
| 2,360,755 | 10/1944 | Boor | 267/8 R X |
| 3,041,061 | 6/1962 | Funkhouser | 267/8 R |
| 3,086,622 | 4/1963 | Schultze | 188/315 X |
| 3,340,966 | 9/1967 | Rumsey et al. | 188/322 X |
| 3,630,324 | 12/1971 | Stretten | 188/322 X |
| 3,773,147 | 11/1973 | Wiebe | 267/8 R X |
| 3,794,309 | 2/1974 | Chrokey et al. | 267/34 |
| 3,837,292 | 9/1974 | Wiebe | 267/8 R X |
| 3,868,912 | 3/1975 | Wagner et al. | 105/197 DH |
| 3,874,307 | 4/1975 | Schwam | 197/197 DH |

Primary Examiner—Albert J. Makay
Assistant Examiner—Howard Beltran
Attorney, Agent, or Firm—Darbo & Vandenburgh

[57] ABSTRACT

A main body member having a head member bolted to one end defines the primary cylinder end portion of a single-ended hydraulic cylinder. A piston rod bearing insert is pressed into the main body bore which defines a cylinder bore. A piston is bolted to a piston rod which extends upwardly through the bearing insert. The piston rod bearing, piston and rod define the primary rod end portion of the single-ended hydraulic cylinder. The above mentioned components define the entire primary structure of a single-ended hydraulic cylinder system and as such provides the entire primary load bearing circuit of a hydraulic cylinder system. A housing member fits about a part of the main body member and the two define a hydraulic fluid reservoir. The piston return spring is an external spring surrounding the piston rod. As the piston is forced into the cylinder the oil displaced from the high pressure portion of the cylinder flows to the reservoir through valving means and passageways which extend upwardly through the piston head, through a relief between the piston head and piston rod and out to a chamber about the piston rod and then through bores into the reservoir. All oil displaced from the high pressure portion of the cylinder is replaced in this region from the head end of the cylinder during return motion of the rod. The return flow is accommodated through passageways in the cylinder body member and the head member which includes an annular recess adjacent the cylinder wall of the main body member.

18 Claims, 3 Drawing Figures

HYDRAULIC RAILWAY CAR SWAY DAMPER

BACKGROUND AND SUMMARY OF THE INVENTION

Hydraulic snubbing devices for ameliorating the rolling motion of railway cars are commonly used. A common practice is to substitute the hydraulic damper for one of the springs of the spring group at each side of the car between the bolster and the side frame of the truck. The following United States Patents are illustrative of hydraulic snubbing devices of this character: U.S. Pat. Nos. 3,773,147, 3,837,292, 3,868,912 and 3,874,307.

The circumstances under which such devices must operate are quite severe. It is necessary that they have a long operational life with little opportunity for periodic service. The ambient conditions (dust, water, etc.) to which they are subjected are likely to have a damaging effect. A particularly significant problem is caused by the fact that the loads are not constantly applied axially of the snubber, but the transverse movements of the bolster with respect to the side frame, and vice versa, act to apply non-axial loads to the snubber. Thus, the snubber must be able to resist such forces that tend to cock the piston rod and piston in the members that define the cylinder and piston rod bearing and to withstand the added wear caused thereby. Furthermore, the heat that snubbers must generate and dissipate to the atmosphere results in elevated temperatures which reduce seal life. These temperatures can be of sufficient magnitude to preclude the use of certain seal materials which could yield optimum service life provided only that the operating temperature were lower. Last but not least of the significant considerations as to such snubbers is the matter of manufacturing cost. It is, of course, very important that the cost be as little as possible while still producing a device that will have the required performance, including service life, etc.

The principal object of the present invention is to provide a hydraulic snubber apparatus for railroad cars which will have excellent characteristics under the operational conditions discussed and yet which will have a relatively low manufacturing cost as compared to commercially available devices. A number of features of the present invention contribute toward this end.

In any hydraulic cylinder system, numerous machining operations are required to produce a structural configuration which will provide for the performance of various functions. These functions which will be treated specifically as regards the primary structure embodied in this invention are the bearing support of the piston rod, the bearing support of the piston, high pressure static sealing, low pressure dynamic sealing, and low pressure static sealing.

The mechanical fit at adjacent structural surfaces which accommodate these functions governs to some extent either or both the integrity and durability of the product as it depends upon these functions. This situation is in particular evidence at the piston rod seal where eccentric loading of the seal by the rod can be a major cause of accelerated seal wear. This eccentric loading of the rod seal results from a side load component on the rod which causes the rod to move laterally through excessive free play in the interface fit between the rod and the rod bearing. This free play increases with wear of the rod bearing which in turn is accelerated by free play between the piston bearing surface and the cylinder bore surface. Lateral free play at both of these reciprocating interfaces, rod and rod bearing as well as piston bearing and cylinder wall, tends to increase wear due to the higher contact stresses; and as a result, free play tends to be self-increasing.

The degree to which an optimum fit may be obtained between any fabricated functional interfaces is determined by machining tolerances, and therefore manufacturing costs, not only at the specific interface portion in question, but also at any other functional interfaces which mutually establish the geometric constraint of any member within the assemblage of all members. All fits must be such that the machine can be assembled without damage to components while assuring satisfactory performance of the various functions. This implies the evidence of minimum free play fits, minimum interference fits, or maximum interference fits, depending on the specific function involved.

In addition to considerations of the dynamic low pressure rod seal function discussed before, the fit between the reciprocating and stationary members must permit freedom from any jamming condition which cannot be overcome by the force of the return spring. Furthermore, the fit of the reciprocating members must be such that internal movements due to eccentric loading of the rod are not supported by either the rod bearing or the piston bearing alone, a situation which can cause either or both failure and premature wear of these components.

In addition to the dynamic functional interfaces discussed above, the performance of the static functional interfaces must also be included in overall fit considerations. In order to avoid degradation of hydraulic performance, there must be sufficient interface contact at the high pressure seal to provide adequate obturation of the head end of the cylinder bore. Low pressure static sealing interfaces on the other hand require close fits in order to ensure adequate compression of elastomer seals to compensate for partial memory loss due to operational and environmental thermal histories.

Machining tolerances may be separated into three general categories including feature size, feature form and feature relationships. The first category pertains to such dimensional aspects as feature lengths and bore diameters. The second involves feature characteristics such as flatness, straightness, and roundness. The third category includes considerations such as parallelism of surfaces, squareness of circular bores to planes and concentricity of circular bores with respect to one another, a major consideration in hydraulic cylinder design.

One aspect of this invention is its structural configuration which offers an economical realization of optimum fits at all functional interfaces. This is accomplished through a configuration which permits articulation of components such that there is a minimum of interdependency on multiple machining operations in establishing any functional interface fit. In this regard, principal attention should be focused on machining tolerances in the third category, specifically that of concentricity of bores. In addition, moreover, the configuration permits economic utilization of precision machining operations in establishing all significant dimensional and characteristic tolerances pertaining to the first and second categories in combination.

The cylinder body is a single unit into which is pressed the rod bearing. In a preferred embodiment the interface of the two members is an extension of the surface defining the cylinder bore, and therefore the accuracy of the positional relationship of the internally pressed surface and the cylinder wall is obtained in a single machining operation on an open-ended bore. As a consequence, the only machining operations which can introduce bore eccentricities limiting the allowable closeness of fit at interfaces between reciprocating and stationary members are confined to the internal bore of the rod bearing and the rod pilot in the piston. The high pressure end of the cylinder is closed by a head member which serves as the reaction member contacting the side frame of the car truck. This member is rigidly fastened to the cylinder at the bottom flange of that structure by virtue of a multiplicity of flange screws.

With the addition of the piston rod which is bolted to the piston in situ at assembly, all aforementioned components comprise the system primary structure and as such transmit all thrust loads, including any prevailing transverse component, between the car bolster and car truck side frame. It can be established that this arrangement of a single-ended cylinder primary structure provides for specification of the minimum acceptable clearance fit between reciprocating and stationary members for any given specification of machining tolerances. Furthermore, it will be seen in the following discussion that the primary structure configuration provides for an effective accommodation of secondary functional interfaces without compromise of the aforementioned fit. Also, with the exception of the press fit of the rod bearing, all fastening in the primary structure is accomplished through the use of relatively long screws with relatively short thread engagement lengths. This approach provides one of the better means of obtaining positive, vibration resistant structural fastening.

A novel approach is used to provide a dimensionally compact solution to high pressure static sealing and return valve seating without requiring excessive fabricating precision. These functions are accommodated by a single ring member located generally in the annular recess in the cylinder head member. The ring is manufactured with an outside diametric dimension such that there is a slight interference fit with the cylinder bore. This fit occurs at the edge juncture of the cylinder bore and the small chamfer at the head end of the bore and is accomplished when the reaction head is assembled to the lower cylinder flange by means of the flange screws. Prior to this operation the ring is free to "float" in the recess and therefore is self-locating with respect to the aforementioned edge. This approach to high pressure static sealing is thus free from most fit problems related to machining eccentricities and takes full advantage of the diametrical precision usually associated with a straight through cylinder bore honing operation. The edge or line contact sealing interface which permits the ring to have a low profile height is further relieved of manufacturing tolerance requirements by providing the ring with a self-sealing geometry under hydraulic pressure. The ring is of generally "U" or "L" shaped cross section, the base leg being somewhat lower than the sealing edge. As a result the exterior wall of the ring tends to deflect radially outwards under hydraulic pressure thus further obturating the cylinder bore. The top inner portion of the ring serves as the seat for the return flow check valve which is comprised of a thin elastically deformable plate located laterally by a lug protruding through a central hole in the plate, such lug being a portion of or a separate member joined to the reaction head member. The low profile height of the ring, by virtue of its minimal intrusion into the working chamber space of the cylinder bore, offers a maximal piston skirt length and therefore a maximal spread between the rod bearing and piston bearing contact points. This feature is important in minimizing bearing stresses, and therefore bearing wear, since it provides for both the reduction of bearing loads as well as closer acceptable fits between reciprocating and stationary members which in turn results in lower bearing contact stresses.

Low pressure static sealing at the head end of the primary hydraulic structure is provided by an O-ring situated in a groove located at the interface of the cylinder bottom flange and the cylinder head reaction plate. The geometric consistancy, and therefore the sealing integrity, of this face seal application is maintained by the flange screws which prevent relative motion of the two structural members which must transmit the primary transverse loads associated with the system. Furthermore, with the exception of a very minimal squareness consideration pertaining to the high pressure sealing ring, the geometry of the face seal has no bearing on other functional interfaces, and therefore the precision of its fabrication influences no other functional fit.

Low pressure static sealing at the rod end of the system is accomplished at the cylinder bore by the exterior of the low pressure dynamic rod seal. The sectional thickness of this seal should be relatively great since the thickness influences the degree of memory which can be realized in an elastomer seal. The greater the thickness, the more the memory provided the diametrical squeeze is increased. While this squeeze increases seal drag, and therefore seal wear, this type of seal design is usually optimized at some sectional thickness as provided by the rod and cylinder bore diameters shown in the subject device. A somewhat greater seal sectional thickness could be accommodated through a snap in installation approach by undercutting the cylinder wall at the seal location.

The optimum use within the system of axial space is extremely important in providing outstanding endurance characteristics. In addition to the large bearing spacing mentioned before, the device should be able to accommodate a heavy duty rod wiper for exclusion of foreign matter and a rod seal of substantial length. The rod seal length provides stability to the seal thus enhancing its sealing capability as well as its resistance to wear. Innovations for effectively utilizing internal axial space are incorporated at both the top and bottom end of the cylinder bore. At the upper end two relatively closely spaced grooves are undercut into the cylinder wall. The uppermost groove captivates the relatively thin retainer ring which serves as the extension stop for the reciprocating members. The lower groove intercepts the diagonally running passages in the cylinder upper flange which provide communication between the discharge ends of the cylinder bore and the reservoir. This interception obviates the need to fabricate the diagonal passages all the way to the cylinder wall thus further conserving axial space commitments. Optimal use of axial space at the head end of the cylinder is provided by specific structural compaction of secondary functions at this end of the cylinder. In addition to the low profile height offered by the high pressure seal and valve seat ring, the means of captivating the return flow valve plate provide for additional axial space efficiency. Because the plate is very thin (approximately 0.010 inches thick) it can accommodate a rigid constraint without provision of any guides, stops, or auxiliary springs and utilize elastic deformation solely as the means of affording relatively free return flow of fluid. The plate flexibility also accommodates any small eccentricities between the ring seat and locating lug as well as small parallelism deviations between parts without incurring significant additional stresses. Furthermore, the return flow checking function can exhibit a small preload merely by incorporating a slight height difference between the valve seat portion of the ring seal and the central region of the reaction head. The valve plate is rigidly captivated against this region which supports most of the plate during the pressure phase of the hydraulic cycle. The captivation means can be accomplished through the use of a stand-off ring, washers, and screw respectively situated around, on, and in the central locating lug. Other similar means may be used for the valve plate captivation, but the basic configuration and approach lends itself in general to the effective use of very small components for this function. As a result, these components can be designed to fit into the space surrounded by the heads of the screws used to secure the rod to the piston. This fit is realized at full downward excursion of the rod and piston and provides one of the major contributions to axial space efficiency. The valve plate locating lug may incorporate, as shown in the illustrations, a backstop member to prevent possible excessive deformation of the valve plate should the rod and car bolster become separated during return stroke motion and the machine exhibit a momentary hang-up followed by rapid acceleration induced by the return spring.

The reservoir for the hydraulic fluid is defined by part of the outside wall of the main cylinder member and a reservoir member which encircles that part but sustains none of the system primary loads. The two members meet at a pair of equal diameter cylindrical geometries. This provides for the economical fabrication of a precision fit at these low pressure static sealing interfaces. O-rings provide fluid seals where the faces abut. The reservoir member is held in place merely by reason of its bottom abutting the cylinder head and its top abutting a retaining ring.

The passageway for the discharge of hydraulic fluid from the cylinder into the reservoir passes upwardly through the cylinder head and outwardly to a chamber about the piston rod and thence through passages into the reservoir. The fact that there is no return flow through the piston from the compensation region to the working region of the cylinder volume and the fact that all hydraulic fluid discharged from the cylinder enters the reservoir from above, while the return passageway withdraws hydraulic fluid from the bottom of the reservoir means that the heated hydraulic fluid is constantly being withdrawn and replaced with cooled hydraulic fluid from the reservoir. Furthermore, during each cycle of machine operation a full working volume, i.e., piston swept volume, is circulated through the reservoir. In usual applications of this type of device only a dunnage, or rod swept volume, of fluid is circulated through a reservoir region during each cycle. This increased cyclical circulation of hot fluid through that region where the majority of heat transfer to the environment occurs results in lower operating temperatures. The discharge passageway from the cylinder includes at least two different orifices in a plate secured to the bottom of the piston by the same bolts that connect the piston and piston rod. The valve members of two check valves within the piston bear against the top of the orifice plate. One of these orifices is quite small and the spring of the check valve associated therewith is weak so that the check valve does little more than serve to permit air to be exhausted from the cylinder, while most of the control of the flow of hydraulic fluid from the cylinder is performed by the larger orifice. Alternately, that spring can be omitted and reliance placed on gravity to seat the ball on the seat.

By reason of features already mentioned, and the fact that the return spring for the piston is external to the cylinder, a substantial distance between the bearing areas on the piston rod and the bearing areas on the piston is achieved. Thus, there is improved performance so far as non-axial loading is concerned. The existence of the return spring outside the cylinder permits the use of a stronger spring. Thus, the contact force of the seals employed in conjunction with the piston and piston rod can be increased for better sealing and need not be compromised such as is often the case if a relatively low strength return spring is employed.

Further objects and advantages will become apparent from the following description and drawings.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The disclosed embodiment of the invention is to be used between the side frame, represented by line 10, (or a seat thereon) of a railway car truck and the car bolster, represented by line 11, supported on the truck. The principal components (excluding the various seals) of this embodiment are: a piston, generally 12; a piston rod, generally 13; a piston return spring, generally 14; a discharge passageway, generally 15, having check valves therein for the flow of oil from the cylinder to the reservoir; a return passageway, generally 16, for the flow of oil from the reservoir to the cylinder; and a body comprising a main body member, generally 17; a piston rod bearing, generally 18; a cylinder head, generally 19, and a reservoir member, generally 20. The main body member and reservoir member define a reservoir 21. The reservoir member has a fill opening closed by a pipe plug 22. Normally the level of hydraulic fluid in the reservoir will be just below this fill opening.

Figure 1:
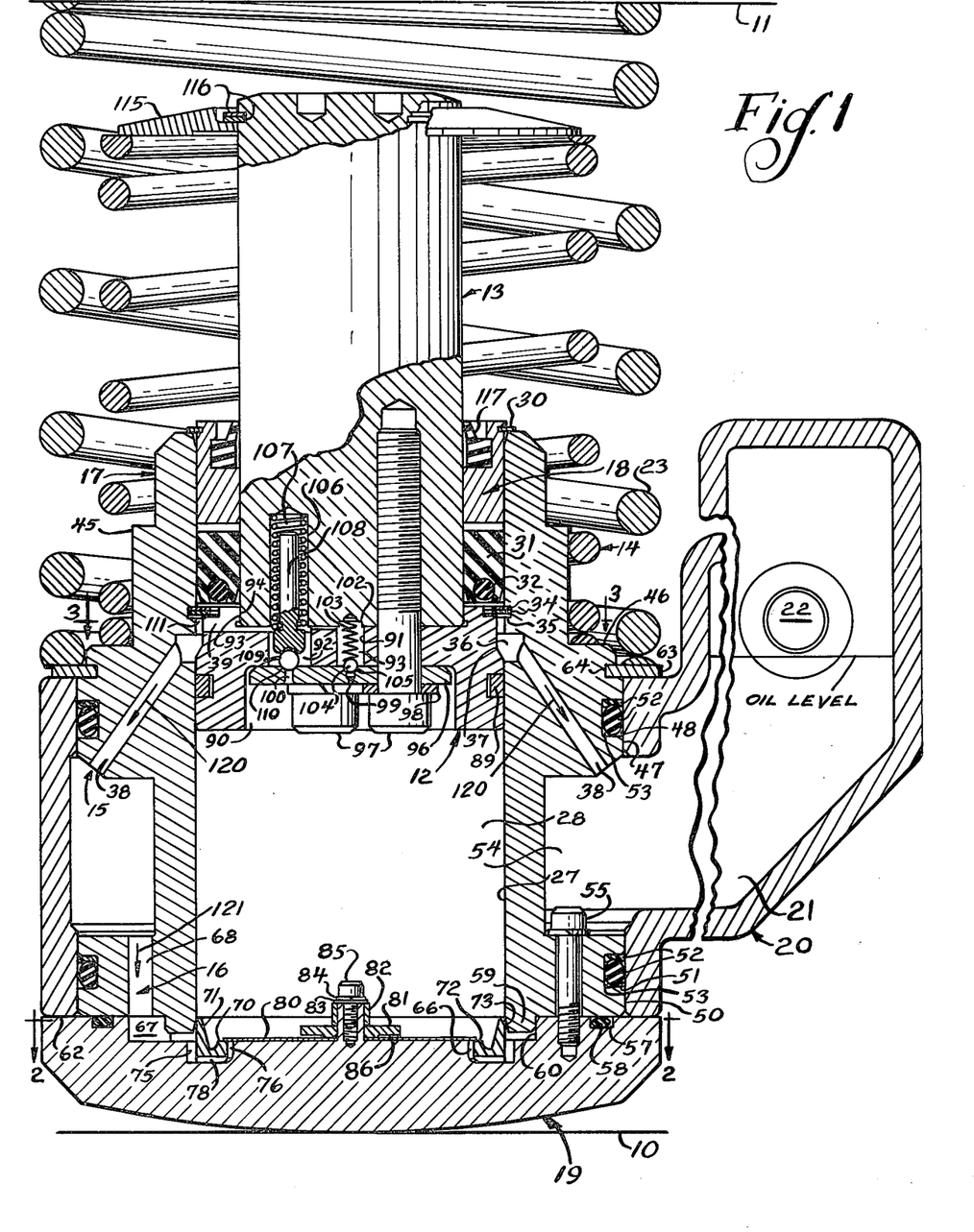
FIG. 1 is an axial section through an embodiment of the invention.
Figure 2:
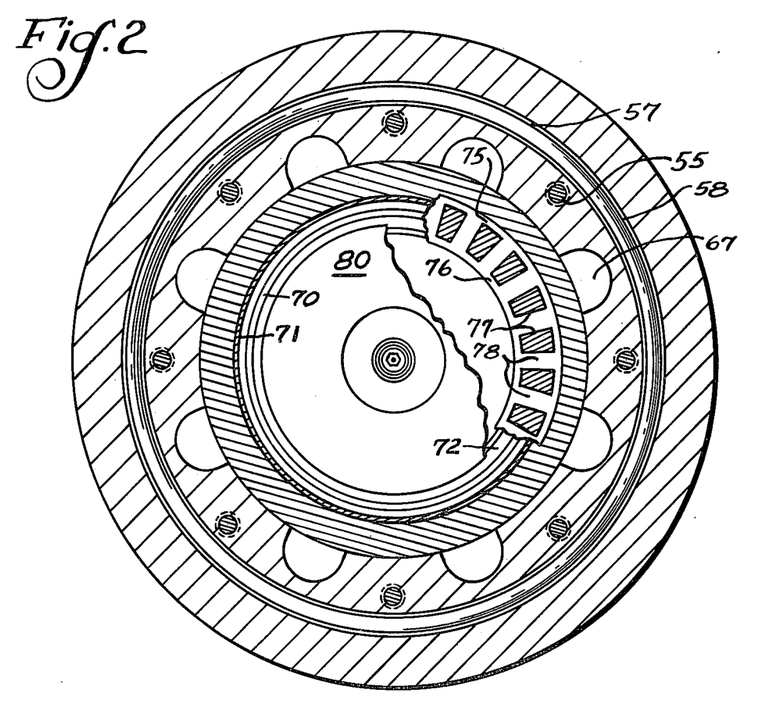
FIG. 2 is a section as seen at line 2—2 of FIG. 1.
Figure 3:
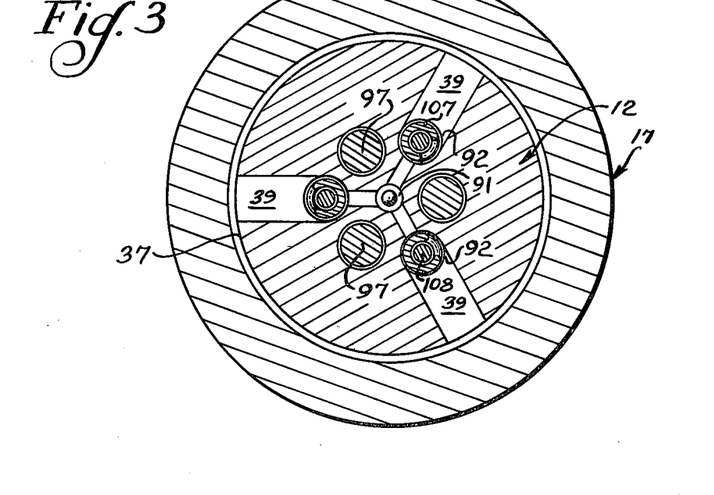
FIG. 3 is a section as seen at line 3—3 of FIG. 1.

In use the snubber will be mounted upright as pictured in FIG. 1 and a compression coil spring 23 between the bolster and the snubber holds the snubber in place with the cylinder head 19, serving as a reaction member, firmly seated against the side frame 10. Spring 23 holds the top of the piston rod 13 spaced from the bolster 11 when the railroad car is not loaded, but with a loaded car the spring 23 will be compressed sufficiently so that the bolster 11 bears against the top of the piston rod.

The main cylinder member is annular whereby it is easily formed from a metal blank of high strength material (steel) by comparatively simple metal working lathe operation. It has an internal wall 27 which defines the cylinder or piston chamber 28 and the upper part of which defines a cylindrical cavity to receive the piston rod bearing 18 and a piston rod seal 31. The bearing 18 is press fitted into body member 17 and thereby frictionally held in place. To make sure that the bearing is not pressed too far in it is provided with a retaining ring 30 which will abut the top of the body. In the disclosed embodiment the internal wall 27 is the same diameter throughout its length which simplifies the manufacturing operation; however, in some embodiments the cylinder portion and the bearing cavity might have different diameters. Thus, there is a minimum of mating faces to affect the accuracy of alignment of the axis of the bearing with respect to the axis of the cylinder. Below the bearing is a piston rod seal 31. A tensioned O-ring 32 fitted into this seal ensures that good sealing is obtained over a relatively long service life. Below the seal are a pair of retaining rings 34 seated in a groove 35 in the body. These restrict the upward movement of the piston to a "rest" position, as well as preventing a downward movement of the seal.

A groove 36 in the wall of the body and a relief 37 in the upper side of the piston define a chamber which forms a part of the discharge passageway 15. This chamber communicates with reservoir 21 through a plurality of bores 38. The chamber also communicates with three reliefs in the form of slots 39 in the top of the piston and extending below the piston rod. A smaller extension of these slots extend to the axial center of the piston.

At the exterior of the upper portion of the main body member is a cylindrical wall 45 which terminates at an abutment 46. Abutment 46 forms a seat for return spring 14. Below abutment 46 is a cylindrical wall which in part forms face 47 mating with a cylindrical face 48 of reservoir member 20. Adjacent the bottom of the main body member is a cylindrical face 50 which mates with face 51 of the reservoir member. At each of these pairs of mating faces are pairs of O-rings 52 received in slots 53 in the main body member and providing fluid seals at the mating faces. Between faces 47 and 50 the exterior of the body member is of smaller diameter and thereby defines a recess 54 of annular configuration. This recess not only increases the volume of the reservoir 21, but provides access to cap screws 55 which hold the cylinder head onto the main body member. The end of the main body member has an annular slot 57 in which is an O-ring 58 to provide a fluid seal between the cylinder head and the main body member. The lower end of the main body member also has an annular pilot or flange 59 which is received within and abuts a cylindrical wall 60 of the cylinder head 19.

The cylinder head 19 extends outwardly sufficiently far to form an abutment 62 against which the lower edge of the reservoir member 20 bears. The reservoir member is restrained against upward movement by a retaining ring 63 seated in a groove 64 in the main body member. This retaining ring also forms a seat for compression coil spring 23.

The cylinder head has an annular groove 66 coaxial with the cylinder 28. Intermediate each pair of bolts 55 is a radial slot 67 which communicates with groove 66 and with a bore 68 extending from the end of main body 17 into the recess 54 which forms a part of the reservoir 21. The groove, slots and bores all form a part of the return passageway 16.

Positioned in groove 66 is a ring 70 of a relatively rigid material, e.g., alloy steel, which serves both to create a seal with the main body member 17 and as a part of the check valve in return passageway 16. As seen in cross-section, this ring has one leg 71 the peripheral face of which contacts wall 27 and a second leg 72 which serves as a part of the check valve. In the illustrated embodiment, these legs are of different length, but this need not necessarily be the case; thus the cross-sectional configuration of this ring is referred to as being of a generally "U" shape which describes the fact that it has two legs. The distal end of wall 27 has a bevel 73 to facilitate inserting the ring during assembly. When the fluid in cylinder 28 is under pressure that fluid acts on the inner, exposed face of outer leg 71 to urge that leg firmly into contact with wall 27, thus providing a good seal between the ring and the wall.

The ring is approximately centered in groove 66 whereby there are annular spaces 75 and 76 at each side of the ring. The ring has a plurality of downwardly extending feet 77 whereby there are radial passages 78 between the spaces 75 and 76. Again, the spaces 75 and 76 and passages 78 form a part of the return passageway 16.

A flexible disc 80 has its lower face at its periphery overlying and in contact with the top of leg 72 of ring 70. This disc is held in place by a washer 81, sleeve 82, washer 83, lock washer 84 and cap screw 85. Around the periphery of washer 81 is a relief 86. Thus the washer only bears on the central portion of the disc. The relief on the washer permits the disc to dish upwardly to a limited extent before the periphery of the washer is contacted, whereupon the periphery of the washer applies a restraining force to resist further upward movement of the disc. Thus when low pressure conditions exist within cylinder 28 as a result of the piston being moved upwardly, the periphery of disc 80 will move upwardly a short distance permitting hydraulic fluid to return to the cylinder from the reservoir through passageway 16. Under static conditions, or when the piston is moving downwardly and the cylinder 28 is pressurized, the periphery of the disc 80 bears against the leg 72 of ring 70 to provide a seal. Thus the disc and the inner leg of the ring serve as the check valve in return passageway 16.

The piston 12 has a conventional piston ring 89. The exposed face of the piston has a central cavity 90. A central bore 91 extends axially through the piston from the cavity 90 to the slots 39. In orbital arrangement about the piston axis are three bores 92 which likewise extend from cavity 90 to slots 39. The upper end of the piston has an axially aligned cavity 93 in which the piston rod 13 is received. Thus there is a cylindrical wall 94 about cavity 93 which aligns the piston on the piston rod.

An orifice plate 96 is held in cavity 90 by cap screws 97 which hold the piston to the piston rod. Lock washers 98 are used under the heads of the cap screws. This orifice plate has a small, central orifice 99 aligned with bore 91 and three large orifices 100 aligned with bores 92. A bore 102 is formed in the piston rod to define a seat for spring 103 which holds ball 104 on a seat 105 in the orifice plate. Spring 103 is a relatively light spring. Spring 103 can be omitted and gravity alone relied on to seat ball 104 on its seat. Similarly, there are three bores 106 employed to define seats in the piston rod for springs 107. These springs bear against plungers 108 which in turn hold balls 109 onto seats 110 of the orifice plate. Springs 107 are relatively strong springs. Thus the discharge passageway 15 from cylinder 28 to reservoir 21 is defined by orifices 99 and 100, bores 91 and 92, slots 39, the space 111 about the piston and defined by piston relief 37, groove 36 in the main body and bores 38. The check valves formed by ball 104 and balls 109 (with the associated springs, etc.) are the check valves in this discharge passageway which permit hydraulic fluid to flow from the cylinder to the reservoir, but prevent any return flow through that passageway. Orifice 99, in conjunction with the relatively light spring 103, is employed to permit air to be discharged from the cylinder. It is so small that near squarewave force performance can be provided if necessary by the main orifices 100. Performance tuning can be achieved soley through alterations in the size of the orifices in the orifice plate, e.g., by substitution of an orifice plate having another orifice size therein.

At the distal end of the piston is a pressure plate 115 forming abutment means against which the piston return spring 14 bears. This plate is held onto the piston rod by retaining rings 116 seated in a slot in the piston rod. A piston rod wiper ring 117 is seated in the outer end of the piston rod bearing 18.

To assemble the unit, the retaining rings 34 are put into the main body member 17. The assemblage of the piston rod and piston, with the check valves, orifice plate, cap screws and piston ring is then slipped in from the lower end of the cylinder 28. If the cap screws 97 have not already been tightened, this may then be done. When a piston rod centering wall 94 is not employed, the procedure of tightening the cap screws 97 after the piston, piston rod and piston rod bearing are in place may be employed for the purpose of assuring axial concentricity of the piston and piston rod in their respective bearings. The seal 31 with the ring 32 therein can then be slipped over the distal end of the piston and put into place. Similarly, the piston rod bearing, carrying the wiper 117 and the ring 30, can be slipped over the piston rod and press fitted into place. At that stage, or later, the return spring 14, pressure plate 115 and retaining rings 116 can be put on.

The ring 70, followed by disc 80, and the elements holding the disc, can be mounted on the cylinder head. With the O-ring 58 on the cylinder head, the cylinder head is mounted on the body member and fastened in place by tightening cap screws 55. With O-rings 52 on the body member, the reservoir member 20 thereafter is slipped over the body member and when in position abutting the cylinder head, the retaining ring 63 is put in place.

The reservoir 21 may be filled with hydraulic fluid either before or after the assembled buffer unit is put into a railway car. Putting the buffer unit in place in the railway car would be the same as existing units. At that time the compression spring 23 is put into place.

Initially, the cylinder 28 will have at least some air in it. That air will, of course, be in the upper part of the cylinder. As the piston is moved downwardly the first few times, the air will be expelled through orifice 99, since the resistance of spring 103 is relatively small. After the air has been expelled from the chamber, the flow of hydraulic fluid from the cylinder to the reservoir will primarily be through the large orifices 100. This hydraulic fluid from the cylinder will be discharged into the upper part of the oil content of the reservoir through the bores 38 as indicated by the arrows 120. However, the return of hydraulic fluid from the reservoir to the cylinder is from the bottom of the reservoir, through bores 68 as indicated by the arrow 121. This is a desirable feature since there will be a heating of the hydraulic fluid in the cylinder as a result of the forces applied to it. None of this heated oil returns to the cylinder until after it has mixed with the cooler oil in the reservoir because of the separation of the discharge and return passageways.

I claim:

1. In a hydraulic snubber apparatus for sway control of railroad cars and comprising a body defining a hydraulic cylinder having a closed end and an open end, a piston in the cylinder and having a normal rest position therein and movable from the rest position deeper into the cylinder, a piston rod connected to said piston and extending outside of said cylinder, said body including a bearing and sealing means about the piston rod, a hydraulic fluid reservoir, discharge passageway means between the reservoir and the cylinder for the flow of hydraulic fluid from the cylinder to the reservoir as the piston moves deeper into the cylinder, orifice means and first check valve means in said discharge passageway means, return passageway means between the reservoir and the cylinder for the flow of hydraulic fluid from the reservoir to the cylinder as the piston moves toward the rest position, second check valve means in said return passageway means, and spring means for urging said piston toward its retracted position, the improvement:

wherein said body comprises
a main body member having an upper end and a lower end, an internal cylindrical opening adjacent the lower end and forming said cylinder and two external annular faces, one being adjacent said lower end and the other spaced from said lower end;
means across said lower end and forming said closed end;
a reservoir member having two, spaced, internal annular faces mating with said annular faces of said body member;
said members defining said reservoir which is at least partially between said mating faces, said body having O-ring grooves at said mating faces;
O-rings in said grooves and forming fluid seals at said mating faces; and
an upwardly facing annular seat, said spring means resting on said seat and extending upwardly therefrom;
comprising abutment means adjacent the distal end of the piston rod and secured thereto, the upper end of the spring means bearing against the abutment means; and
wherein said discharge passageway means extends upwardly from the cylinder to above the cylinder end of the piston and thence to said reservoir at an upper portion thereof.

2. In an apparatus as set forth in claim 1,
wherein said means forming said closed end is a separate component from said main body member, and has an upper face a part of which extends outwardly beyond said main body member, said reservoir member being seated against the outwardly extending part of said face;
including an O-ring seal between said separate component and said main body member; and including means connected to the main body member at the upper end of said reservoir member and holding the reservoir member against upward movement away from said separate component.

3. In an apparatus as set forth in claim 2 and for use in an installation in which a compression spring is seated on said body, the further improvement:
wherein the last mentioned means comprises a retaining ring engaging the body member and bearing against the reservoir member, said retaining ring being closer to the lower end of the body member and being of greater diameter than is said annular seat, said retaining ring forming a seat for said compression spring; and
including bolts holding said separate component onto said body member.

4. In an apparatus as set forth in claim 2, wherein said return passageway means extends from the closed end of the cylinder, past said separate component and into the lower portion of the reservoir, whereby the hydraulic fluid from the cylinder enters an upper part of the reservoir and the hydraulic fluid returning from the reservoir to the cylinder is drawn from the lower part of the reservoir.

5. In an apparatus as set forth in claim 4,
wherein said separate component has an annular groove on its inner face and aligned approximately with the periphery of the cylinder, said groove having radially inner and outer walls and a base wall therebetween;
including a ring in said groove, said ring having a peripheral face bearing against said body member to form a seal between the ring and the body member, said ring having an annular face inside said peripheral face and facing towards said cylinder, said ring being spaced from said inner and outer walls to define annular spaces therebetween and also defining a space between it and the base wall;
said return passageway means including said spaces; and
said flexible plate and said annular face of the ring forming the second check valve means.

6. In an apparatus as set forth in claim 5,
wherein said body member includes a portion extending upwardly beyond said rest position, said body portion having an internal wall defining a cylindrical cavity coaxial with said cylinder; and
an annular bearing insert in said cavity and abutting said wall, said piston rod extending through said insert with the insert forming said bearing for said piston rod.

7. In an apparatus as set forth in claim 6,
wherein said cylindrical cavity is the same diameter as said cylinder; and
including means to stop said piston from upward movement beyond said rest position and comprising
said body member having an annular slot in said wall adjacent the lower end of the cavity; and
a retaining ring seated in said annular slot to abut the top of the piston when it is in the rest position.

8. In an apparatus as set forth in claim 6,
wherein said piston and piston rod are separate elements each having a face mating with a face of the other, one of said faces having a relief therein forming a part of said discharge passageway means, said piston having an opening therethrough from the relief to the underside of the piston and forming another part of said discharge passageway means; and
including bolts extending through the piston and threaded into the piston rod and holding the piston and piston rod together.

9. In a hydraulic snubber apparatus for sway control of railroad cars and comprising a body defining a hydraulic cylinder having a closed end and an open end, a piston in the cylinder and having a normal rest position therein and movable from the rest position deeper into the cylinder, a piston rod connected to said piston and extending through the open end outside of said cylinder, said body including a bearing and sealing means about the piston rod, a hydraulic fluid reservoir, a discharge passageway means between the reservoir and the cylinder for the flow of hydraulic fluid from the cylinder to the reservoir as the piston moves deeper into the cylinder, orifice means and a first check valve device in said discharge passageway means, return passageway means between the reservoir and the cylinder for the flow of hydraulic fluid from the reservoir to the cylinder as the piston moves toward the rest position, a second check valve device in said return passageway means, and spring means for urging said piston toward its retracted position, the improvement:
wherein said body comprises
a main body member having two ends and an internal cylindrical opening adjacent one of the ends and forming said cylinder, a portion extending from said opening toward the other of said ends, said portion having an internal wall defining a cylindrical cavity coaxial with said cylinder;
an annular bearing insert in said cavity, and abutting said wall, said piston rod extending through said insert with the insert forming said bearing means for said piston rod;
a cylinder head across said one end of said body member; and
bolts securing said cylinder head to said body member.

10. In an apparatus as set forth in claim 9, wherein said cylindrical cavity is the same diameter as said cylinder; and
including means to stop said piston from upward movement beyond said rest position and comprising
said body member having an annular slot in said wall adjacent the lower end of the cavity; and
a retaining ring seated in said annular slot to abut the top of the piston when it is in the rest position.

11. In an apparatus as set forth in claim 9,
wherein said piston and piston rod are separate elements each having a face mating with a face of the other, one of said faces having a relief therein forming a part of said discharge passageway means, said piston having an opening therethrough from the relief to the cylinder side of the piston and forming another part of said discharge passageway means; and
including bolts extending through the piston and threaded into the piston rod and holding the piston and piston rod together.

12. In an apparatus as set forth in claim 11 including an orifice plate having two faces with one of the faces abutting the cylinder side of the piston and an orifice extending between said faces and in alignment with said piston opening, the last mentioned bolts extending through said orifice plate and holding the plate onto the piston; and check valve means in said piston opening and abutting said plate at said orifice for preventing hydraulic fluid from flowing from said piston opening into said orifice and with said plate forming said first check valve device.

13. In an apparatus as set forth in claim 12, including a third check valve device in said discharge passageway means in parallel with said first check valve device, said third check valve device having a different release pressure and a different rate of flow than the first check valve device, said third check valve device comprising:

said piston having a second opening therethrough in communication with said relief, said plate having a second orifice therethrough in alignment with said second opening, said orifices being of different cross-sectional sizes, second check valve means in said second opening and abutting said plate at said second orifice for preventing hydraulic fluid from flowing from said piston opening into said second orifice, both of said check valve means including springs, the spring of the check valve device associated with the larger orifice having greater resistance than the spring of the other check valve device.

14. In an apparatus as set forth in claim 9, wherein said return passageway means extends from the closed end of the cylinder traversing part of said cylinder head and into one portion of the reservoir, and said discharge passageway means extends into another portion of the reservoir, whereby the hydraulic fluid from the cylinder enters said other portion of the reservoir and the hydraulic fluid returning from the reservoir to the cylinder is drawn from said one portion of the reservoir.

15. In an apparatus as set forth in claim 14, wherein said cylinder head has an annular groove on its inner face and aligned approximately with the periphery of the cylinder, said groove having radially inner and outer walls and a base wall therebetween;

including a generally U-shaped ring in said groove, said ring having a peripheral face bearing against said body member to form a seal between the ring and the body member, the fluid pressure in said cylinder and applied to the interior of the "U" of the ring forcing said peripheral face against said body member, said ring having an annular face inside said peripheral face and facing towards said cylinder, said ring being spaced from said inner and outer walls to define annular spaces therebetween and also defining a space between it and the base wall;

including a flexible plate secured to said cylinder head and normally bearing against said annular face of said ring;

said return passageway means including said spaces; and said flexible plate and said annular face of the ring forming the second check valve device.

16. In a hydraulic snubber apparatus for sway control of railroad cars and comprising a body defining a hydraulic cylinder having a closed end and an open end, a piston in the cylinder and having a normal rest position therein and movable from the rest position deeper into the cylinder, a piston rod connected to said piston and extending outside of said cylinder, said body including a bearing and sealing means about the piston rod, a hydraulic fluid reservoir, discharge passageway means between the reservoir and the cylinder for the flow of hydraulic fluid from the cylinder to the reservoir as the piston moves deeper into the cylinder, orifice means and first check valve means in said discharge passageway means, return passageway means between the reservoir and the cylinder for the flow of hydraulic fluid from the reservoir to the cylinder as the piston moves toward the rest position, second check valve means in said return passageway means, and spring means for urging said piston toward its retracted position, the improvement:

wherein said body comprises a main body member having two ends and an internal cylindrical opening adjacent one of the ends and forming said cylinder;

a cylinder head across said one end of said body member; and bolts securing said cylinder head to said body member;

said return passageway means extending from the closed end of the cylinder traversing part of said cylinder head and into the reservoir, said cylinder head having an annular groove on its inner face and aligned approximately with the periphery of the cylinder, said groove having radially inner and outer walls and a base wall therebetween;

including a ring in said groove, said ring having a peripheral face bearing against said body member to form a seal between the ring and the body member, said ring having a circular face inside said peripheral face and facing towards said cylinder, said ring being spaced from said inner and outer walls to define annular spaces therebetween and also defining a space between it and the base wall;

including a flexible plate secured to said separate component and normally bearing against said circular face of said ring;

said return passageway means including said spaces; and said flexible plate and said circular face of the ring forming the second check valve means.

17. In an apparatus as set forth in claim 16, wherein said ring has a generally "U" shaped cross-section with the interior of the "U" facing the chamber and said faces being on the two leg portions of the "U".

18. In a hydraulic snubber apparatus for sway control of railroad cars and comprising a body defining a hydraulic cylinder having a closed end and an open end, a piston in the cylinder and having a normal rest position therein and movable from the rest position deeper into the cylinder, a piston rod connected to said piston and extending outside of said cylinder, said body including a bearing and sealing means about the piston rod, a hydraulic fluid reservoir, a discharge passageway means between the reservoir and the cylinder for the flow of hydraulic fluid from the cylinder to the reservoir as the piston moves deeper into the cylinder, orifice means and first check valve means in said discharge passageway means, a return passageway means between the reservoir and the cylinder for the flow of hydraulic fluid from the reservoir to the cylinder as the piston moves toward the rest position, second check valve means in said return passageway means, and spring means for urging said piston toward its retracted position, the improvement:

wherein said body comprises a main body member having an upper end and a lower end, an internal cylindrical opening adjacent the lower end and forming said cylinder;

a cylinder head across said lower end of said body member; and bolts securing said cylinder head to said body member;

said return passageway means extending from the closed end of the cylinder traversing said cylinder head and into the reservoir at a lower part thereof, said discharge passageway means extending through said piston and into an upper part of the reservoir, whereby the hydraulic fluid from the cylinder enters an upper part of the reservoir and the hydraulic fluid returning from the reservoir to the cylinder is drawn from the lower part of the reservoir; and said first check valve means comprising two check valves in parallel and orifices associated with each check valve, said two check valves having different release pressures and the associated orifices having different rates of flow, the check valve associated with the larger orifice having the greatest release pressure.

* * * * *